US012411843B2

(12) United States Patent
Alkan et al.

(10) Patent No.: US 12,411,843 B2
(45) Date of Patent: Sep. 9, 2025

(54) INTELLIGENT RESOLUTION OF CONFLICTING INFORMATION IN ADAPTIVE DIALOG SYSTEMS

(71) Applicant: INTERNATIONAL BUSINESS MACHINES CORPORATION, Armonk, NY (US)

(72) Inventors: Oznur Alkan, Clonsilla (IE); Adi Botea, Dublin (IE); Elizabeth Daly, Dublin (IE); Akihiro Kishimoto, Castleknock (IE); Radu Marinescu, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 16/193,612

(22) Filed: Nov. 16, 2018

(65) Prior Publication Data

US 2020/0159836 A1 May 21, 2020

(51) Int. Cl.
*G06F 16/2452* (2019.01)
*G06N 5/022* (2023.01)

(52) U.S. Cl.
CPC ....... *G06F 16/24522* (2019.01); *G06N 5/022* (2013.01)

(58) Field of Classification Search
CPC .......... G06F 16/24522; G06F 16/3329; G06N 5/022; G06N 20/00; G06N 3/006
See application file for complete search history.

(56) References Cited

U.S. PATENT DOCUMENTS

| 9,031,216 | B1* | 5/2015 | Kamvar | G10L 15/08 |
| | | | | 379/202.01 |
| 9,466,294 | B1* | 10/2016 | Tunstall-Pedoe | G06F 16/3329 |
| 9,711,137 | B2* | 7/2017 | Baldwin | G06F 40/20 |
| 10,831,839 | B1* | 11/2020 | Ogawa | G10L 13/033 |
| 2013/0007037 | A1 | 1/2013 | Azzam et al. | |
| 2014/0122056 | A1 | 5/2014 | Duan | |
| 2014/0122618 | A1 | 5/2014 | Duan | |
| 2014/0164532 | A1 | 6/2014 | Lynch et al. | |
| 2014/0195621 | A1 | 7/2014 | Rao Dv | |
| 2014/0207882 | A1* | 7/2014 | Joo | H04L 51/04 |
| | | | | 709/206 |
| 2015/0178371 | A1* | 6/2015 | Seth | G06F 16/3329 |
| | | | | 707/748 |
| 2016/0048772 | A1* | 2/2016 | Bruno | G06N 5/04 |
| | | | | 706/11 |
| 2016/0246929 | A1* | 8/2016 | Zenati | G10L 15/22 |

(Continued)

OTHER PUBLICATIONS

Black, "Live from F8—"Group bots" with Messenger Chat Extensions", Chatbots Magazine, Apr. 19, 2017, 11 Pages, https://chatbotsmagazine.com/live-from-f8-group-bots-with-messenger-chat-extensions-641a3d66b367.

(Continued)

*Primary Examiner* — Ann J Lo
*Assistant Examiner* — Fernando M Mari Valcarcel
(74) *Attorney, Agent, or Firm* — Yuanmin Cai

(57) ABSTRACT

Various embodiments are provided for intelligent resolution of conflicting information in a dialog system in a computing environment by a processor. Conflicting information relating to one or more queries may be detected between one or more users using the dialog system. One or more responses may be provided to resolve the conflicting information according to a knowledge domain.

14 Claims, 7 Drawing Sheets

(56) References Cited

U.S. PATENT DOCUMENTS

| | | | | |
|---|---|---|---|---|
| 2016/0379118 A1* | 12/2016 | Ito | ................. | G06Q 10/101 |
| | | | | 706/46 |
| 2016/0379643 A1 | 12/2016 | Ito et al. | | |
| 2017/0180294 A1* | 6/2017 | Milligan | ................. | H04L 51/16 |
| 2018/0129648 A1* | 5/2018 | Chakravarthy | ......... | G06F 40/58 |
| 2018/0183735 A1* | 6/2018 | Naydonov | ............. | G06N 3/006 |
| 2018/0218627 A1* | 8/2018 | Smith Lewis | ......... | G09B 5/125 |
| 2018/0336895 A1* | 11/2018 | Aleksic | ................. | G06F 40/295 |

OTHER PUBLICATIONS

Pesarin et a;., "Conversation Analysis at Work: Detection of Con ict in Competitive Discussions through Semi-Automatic Turn-Organization Analysis", Cognitive Processing, vol. 13, Oct. 2011, 15 Pages.

Sardinha et al., "Conflict Identification with EA-Analyzer", Aspect-Oriented Requirements Engineering, Nov. 2013, 17 Pages.

* cited by examiner

INTELLIGENT RESOLUTION OF CONFLICTING INFORMATION IN ADAPTIVE DIALOG SYSTEMS

BACKGROUND OF THE INVENTION

Field of the Invention

The present invention relates in general to computing systems, and more particularly, to various embodiments for intelligent resolution of conflicting information in a dialog system using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information.

Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, the greater the need to make progress in these systems advantageous for efficiency and improvement.

SUMMARY OF THE INVENTION

Various embodiments are provided for intelligent resolution of conflicting information in a dialog system in a computing environment. Conflicting information relating to one or more queries may be detected between one or more users using the dialog system. One or more responses may be provided to resolve the conflicting information according to a knowledge domain.

In addition to the foregoing exemplary method embodiment, other exemplary system and computer product embodiments are provided and supply related advantage.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
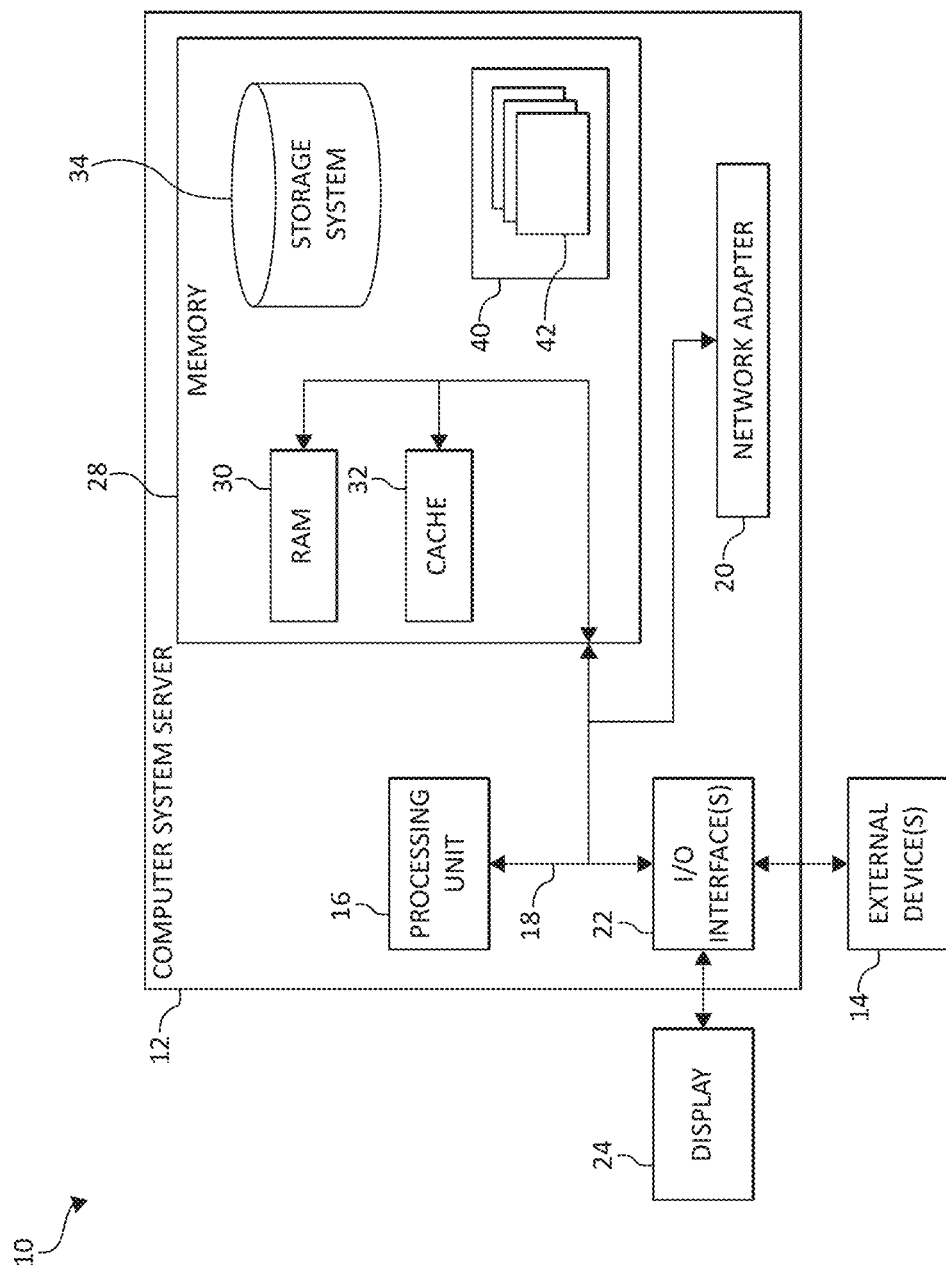
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, home appliances, audio systems, televisions, security cameras, security sensors, among countless other examples. Such IoT computing systems may be employed in dialog systems, energy systems (e.g., energy grids), water networks, traffic networks, smart buildings, and the like.

Moreover, dialog systems can play a key role in the functioning of an organization, such as a business, government, group or other entity. For example, many critical decisions may result from discussions in chat systems, or chat-like conversation systems or chatbots. A chatbot may be an operation which conducts a dialog or conversation, audible, visual, and/or via textual methods. However, when one or more persons are engaged in a conversation conflicting information (e.g., answers) may be provided by one of the users. Accordingly, a need exists for intelligent resolution of conflicting information in a dialog system.

Thus, the present invention provides a cognitive computing system that provides for intelligent resolution of conflicting information in a dialog system (e.g., conversation is between a group of users). The cognitive computing system provides an automated agent to monitor and intervene in the conversation. The agent monitors and reacts to the chat dialog that take place between a group of users. The agent may also speak with individual members in a "one-on-one" chat channel.

For example, consider two or more users engaged in a conversation in a dialog system with an agent monitoring the conversation. The agent identifies questions with no answer (or no correct answer) provided, questions with multiple inconsistent answers, and other types of conflicting information. When users are in a conflict (e.g., cannot decide on an answer for a raised question during conversation such as: Who was the main actor in the movie X?, Where did John Doe graduate from?," etc.), the agent may provide an answer using any data that is available such as, for example, using a knowledge base/knowledge domain, user profiles, and the previous conversation histories.

As an additional example, consider a dialog system monitoring conversations with students and tutors (e.g., students involved in a chat together with a teacher and chatbot). The teacher asks questions to the students in order to understand how well they understand a specific topic. The agent listens to the entire conversation between students and the teacher. The agent may communicate with the teacher on a separate dialog channel and may query/report to the teacher how well each student is engaged in the conversation?" For example, the agent may raise alarms for specific students that are not responding well to the teacher (e.g., student fails to provide an answer and/or a correct answer) and a degree or level of understanding of each student for learning and/or understanding a topic.

Thus, the present invention provides a cognitive computing system that provides for intelligent resolution of conflicting information in a dialog system in a computing environment. Conflicting information relating to one or more queries may be detected between one or more users using the dialog system. One or more responses may be provided to resolve the conflicting information according to a knowledge domain.

In one aspect, the present invention provides a cognitive system to enable a one or more users to engage in a dialog with a chatbot. The cognitive system may monitor a dialog between two and/or several users. Conflicting information may be detected in the dialog and/or in questions raised in the dialog, for which no satisfactory answer is provided by the users.

In an additional aspect, using as input, a history of conversation, access to a knowledge base to look up answers for the raised questions, an output may be provided that includes, for example: highlighting/identifying (e.g., pointing out) conflicting information identified in the conversation, and/or highlighting/identifying (e.g., pointing out) a question raised in the dialog, for which no satisfactory answer has been provided.

User profile information may be accessed and/or used/added for resolution of the conflicting information. The knowledge domain may be populated with various facts extracted from the history of the conversation and/or from one or more external data sources (e.g., webpages, etc.).

The present invention provides for a cognitive system that may classify may respond to/for a question being issued/raised. The cognitive system may provide an agent to ask/query to one or more users clarification questions in the dialog. The agent can optionally explain/provide reasoning/evidence as to why it needs to ask the immediate/most recent question. A question answering system may be provided where answers can be constructed by calling an external service and/or by using the input data.

Additionally, consider a dialog system in a health domain with medical professional(s) (e.g., doctors, nurses, etc.) discussing a patient's current condition. The doctors may have conflicts regarding recalling another similar patient's condition, etc. The agent may monitor the discussion and may intervene if the medical professionals have conflicts regarding recalling other patients having similar symptoms/conditions (e.g., the doctor recalls patient Y having a similar condition and asks the chatbot to provide additional details about patient Y's case/medical profile). The agent may be consulted to provide some factual data about the patient such as, for example specific blood tests that the medical professional(s) may not currently have access to for reviewing/considering (e.g., "What is the current red cell count in patient X?"). For example, consider the following conversation:

User A: Did you see the blood test result of the patient Y in room 201?

User B: Yes, I believe his situation is similar to patient X that we saw last month. Did you remember patient X? Patient Y has similar complaints and has similar glucose levels to patient X.

User C: Are you sure? I don't think patient Y's results are similar with patient X's results. Patient X had much higher glucose levels.

Dialog System/Chatbot: User C is correct. Patient X's glucose levels were 25% higher at his last sample. Would you like me to display the latest blood test result of him?

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
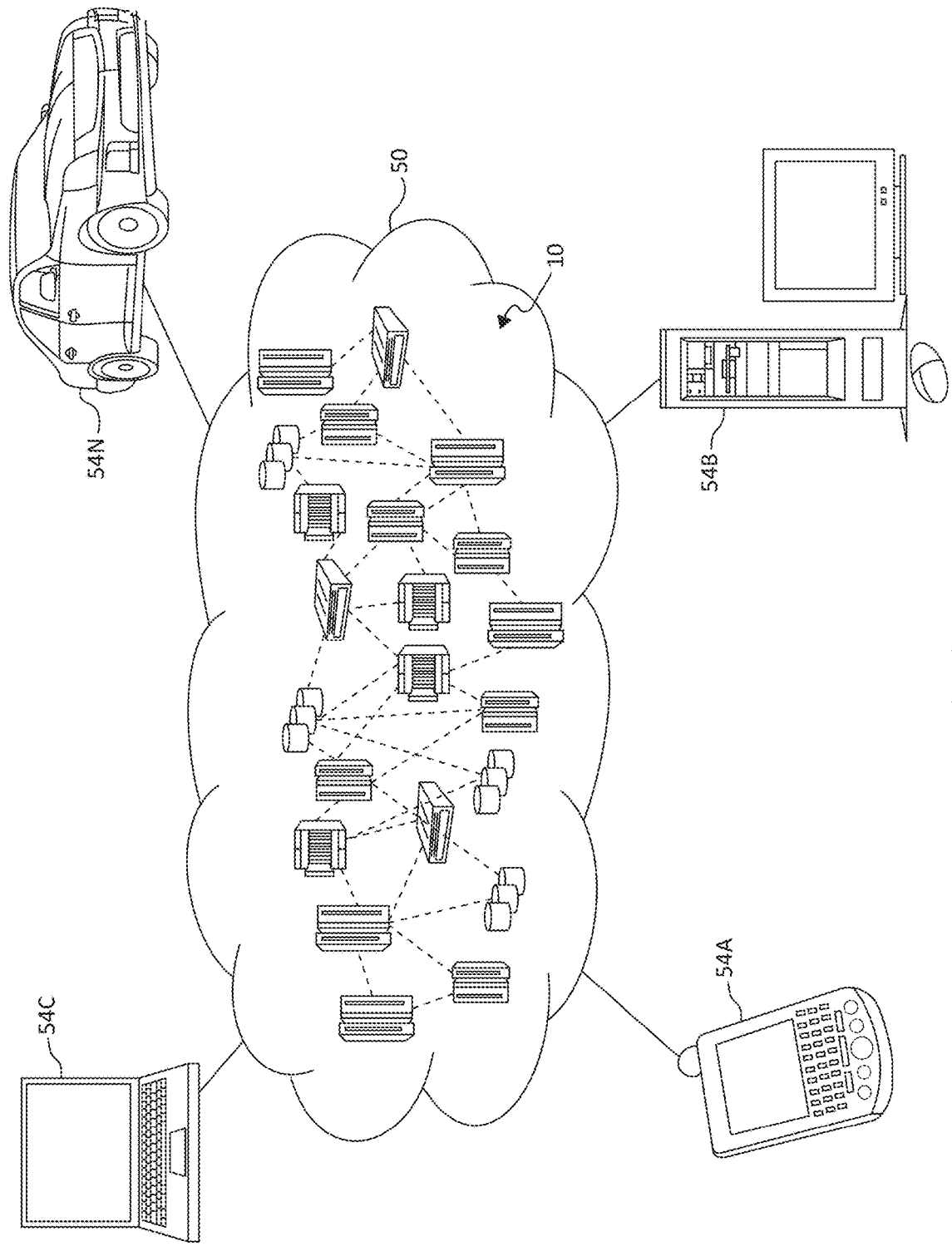
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or other type of computer systems 54N (e.g., an smart watch, biometric sensor, health state monitoring computer system, etc.) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
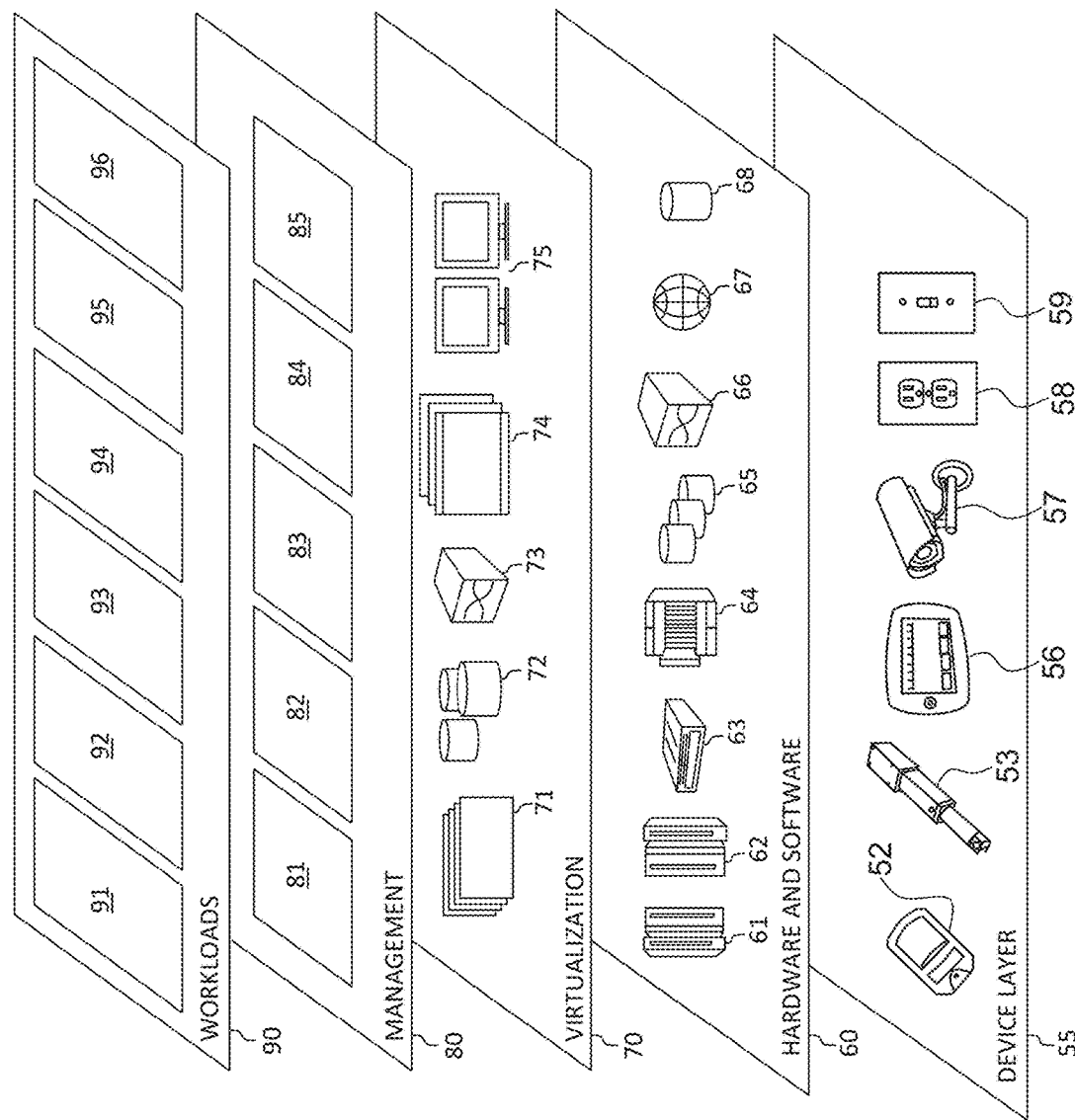
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent resolution of conflicting information in a dialog system. In addition, the workloads and functions 96 for intelligent resolution of conflicting information in a dialog system may include such operations as data analytics, data analysis, and as will be further described, notification functionality. One of ordinary skill in the art will appreciate that the workloads and functions 96 for intelligent resolution of conflicting information in a dialog system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
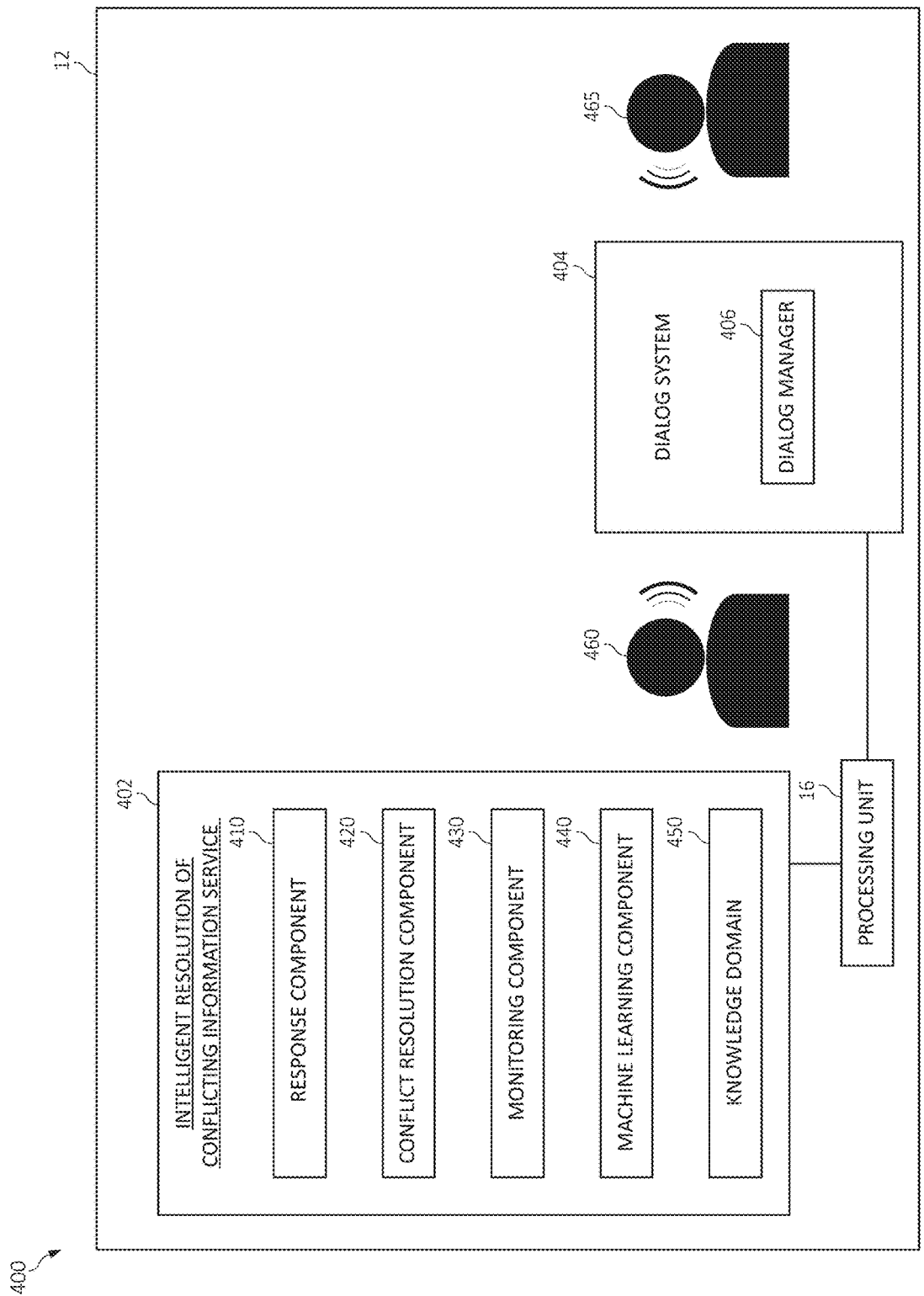
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates workloads and functions for intelligent resolution of conflicting information in a dialog system in a computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent resolution of conflicting information in a dialog system in accordance with the present invention. Many of the functional blocks of a cognitive system 400 may execute as background processes on various components, either in distributed computing components, or on the user device, or elsewhere. Computer system/server 12 is again shown, incorporating processing unit 16 (and memory 28 of FIG. 1 and not shown for illustrative convenience) to perform various computational, data processing and other functionality in accordance with various aspects of the present invention.

The cognitive system 400 may include an intelligent resolution of conflicting information service 402 and a dialog system 404. The dialog system 404 may include a dialog manager 406. The intelligent resolution of conflicting information service 402 may include a response component 410, a conflict resolution component 420, a monitoring component 430, a machine learning component 440, and/or a knowledge domain 450.

The intelligent resolution of conflicting information service 402 and the dialog system 404 may each be associated with and/or in communication with each other, by one or more communication methods, such as a computing network. In one example, the intelligent resolution of conflicting information service 402 and the dialog system 404 may be controlled by an owner, customer, or technician/administrator associated with the computer system/server 12. Furthermore, intelligent resolution of conflicting information service 402 and the dialog system 404 may each be associated with and/or in communication with one or more users such as, for example, users 460 and 465.

In one aspect, the computer system/server 12 may provide virtualized computing services (i.e., virtualized computing, virtualized storage, virtualized networking, etc.) to the intelligent resolution of conflicting information service 402 and the dialog system 404. More specifically, the computer system/server 12 may provide virtualized computing, virtualized storage, virtualized networking and other virtualized services that are executing on a hardware substrate.

In one aspect, the conflict resolution component 420 may detect conflicting information relating to one or more queries between one or more users using the dialog system. The response component 410 may provide one or more responses to resolve the conflicting information according to the knowledge domain 450 (e.g., a knowledge base).

The knowledge domain 450 may be a combination of domains, concepts, dialogs/conversations (including historical dialogs/conversations), discussions, relationships between the domains or concepts, machine learning data, features, parameters, data, profile data, historical data, tested and validated data, or other specified/defined data for identifying, monitoring, validating, detecting, learning, analyzing, monitoring, and/or maintaining data, concepts, and/or relationships between the concepts for resolving conflicting information in a dialog.

The monitoring component 430 may monitor a dialog occurring between the users 460 and 465 using the dialog system 404.

The conflict resolution component 420 may determine the users 460 and 465 provided one or more answers to one or more queries issued to the dialog system 404. The conflict resolution component 420 may assess a level of correctness of one or more answers to the one or more queries and may also determine one or more answers failed to resolve the conflicting information.

The conflict resolution component 420 may also search the knowledge domain 450 to identify the one or more responses (e.g., from historical data/dialogs) to resolve the conflicting information.

The response component 410 may also query (via the dialog system 404) the users 460 and 465 to collect additional information to assist with resolving the conflicting information upon detecting conflicting information.

The machine learning component 440 may initiate a machine learning to perform one or more machine learning operations to collect the user feedback, perform a semantic analysis on the dialogs/communications, train a classifier to classify the one or more queries, learn contextual data associated with the one or more queries, and collect and use a plurality of historical conversations of the dialog system to assist with providing the one or more responses to resolve the conflicting information of the dialog system.

The machine learning component 440 may perform one or more machine learning operations such as, for example, using natural language processing (NLP) and artificial intelligence (AI) to recognize conflicting information and/or understand a dialog of the users 460 and 465 from one or more utterances communicated to the dialog system 404. The instances of the NLP or AI may include an instance of IBM® Watson®. (IBM® and Watson® are trademarks of International Business Machines Corporation).

The machine learning component 440 may perform one or more machine learning operation and learn information based on the feedback collected from one or more users via the feedback collection operation of the machine learning component 440. For example, one or more users may engage the dialog system and the machine learning component 440 may provide feedback to assist the conflict resolution component 420 with one or more reasons, evidences, or responses to assist with resolving the conflicting information upon detecting conflicting information. The machine learning component 440 may store the feedback information in a knowledge domain 450 and may use the feedback data to learn and/or resolve conflicting information in future dialogs.

The machine learning component 440 may perform a machine learning operation for training and learning one or more machine learning models and also for learning, applying inferences, and/or reasoning pertaining to one or more users and queries/responses. In one aspect, the learning component 440 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
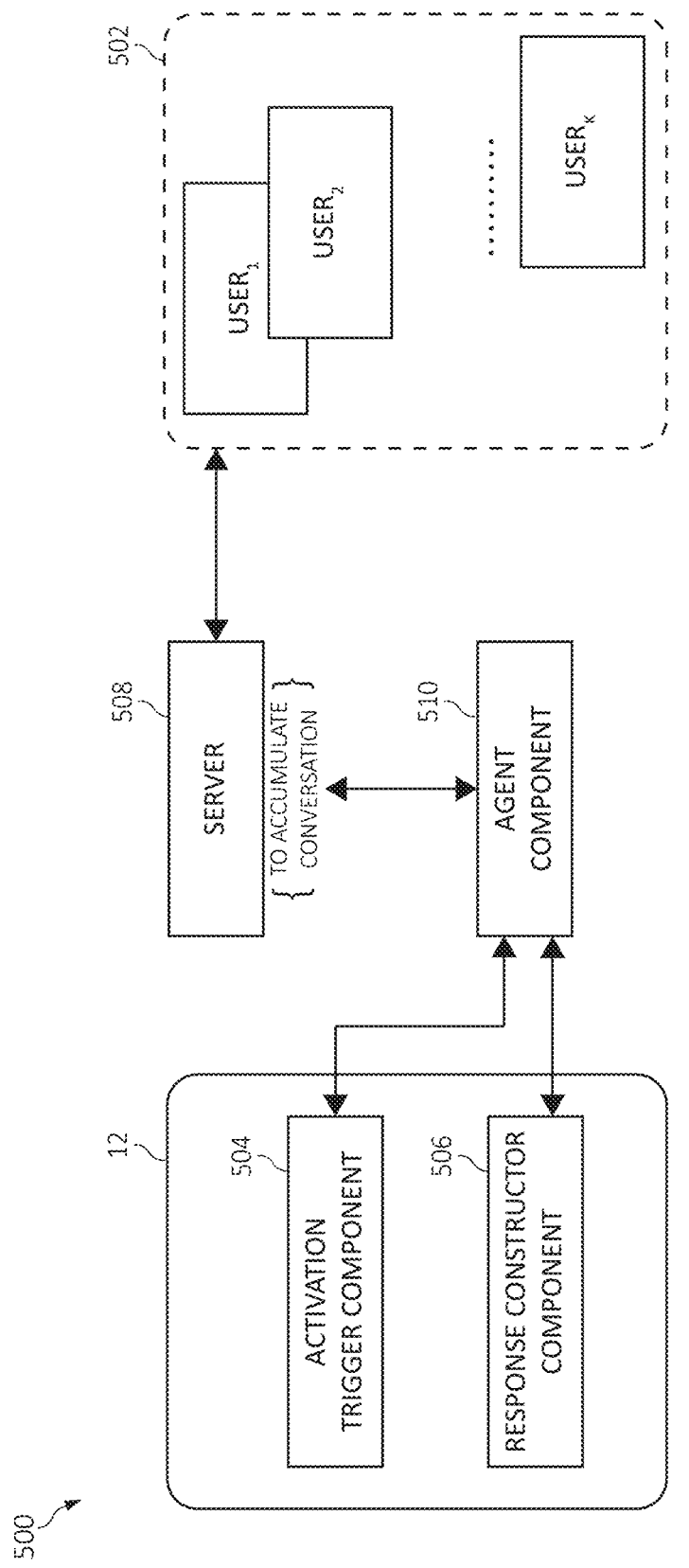
FIG. 5A is additional block diagrams depicting a system for intelligent resolution of conflicting information in a dialog system in accordance with an embodiment of the present invention.
Figure 5B:
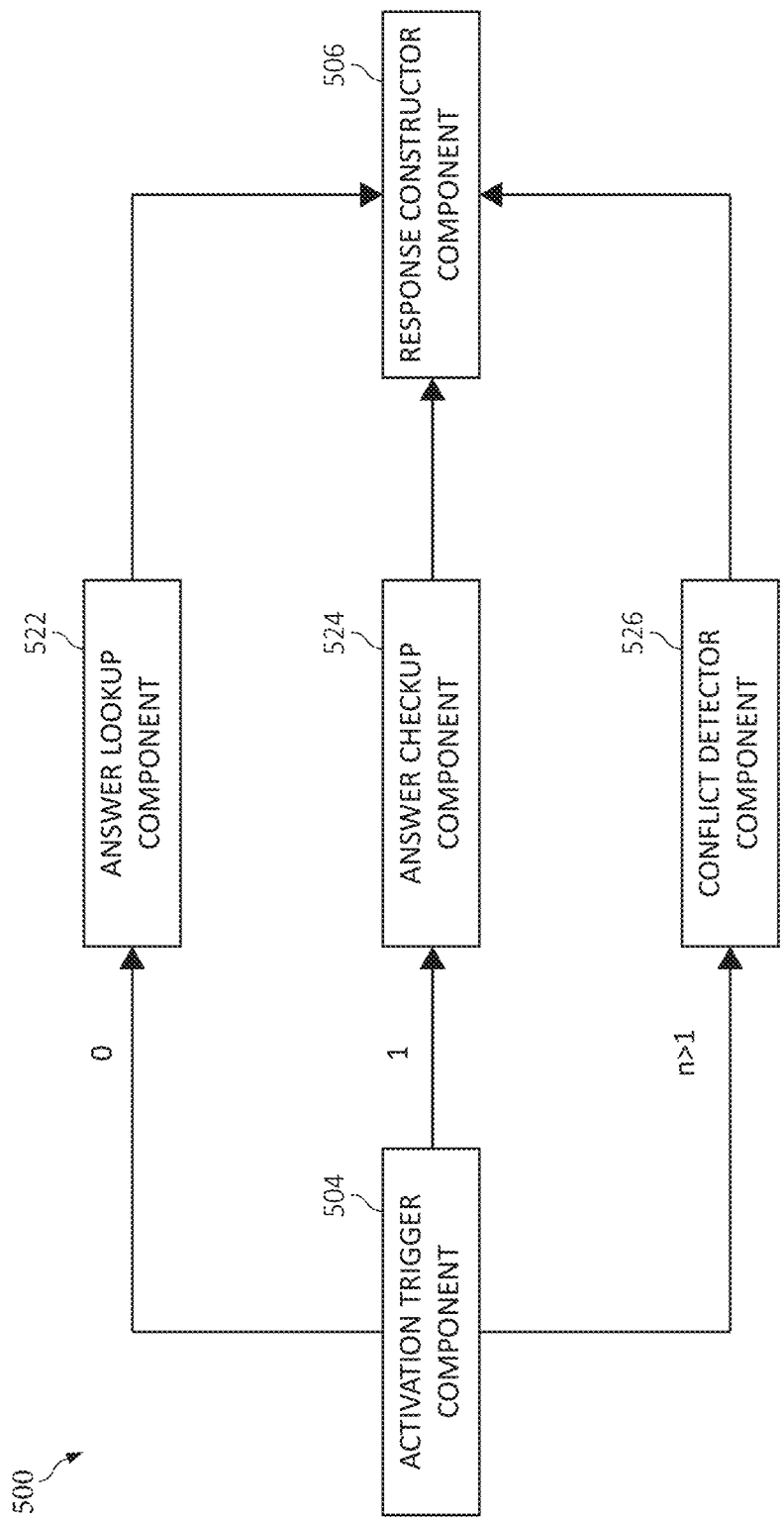
FIG. 5B is an additional block diagram depicting activating an activation trigger in of FIG. 5A in accordance with an embodiment of the present invention.

Turning now to FIGS. 5A-5B, a block diagram of exemplary functionality 500 relating to intelligent resolution of conflicting information in a dialog system is depicted, according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. For example, computer system/server 12 is again shown (incorporating processing unit 16 and memory 28 of FIG. 1 and not shown for illustrative convenience) to perform various computational, data processing and other functionality in accordance with various aspects of the present invention.

With the foregoing in mind, the module/component blocks 500 may also be incorporated into various hardware and software components of a system for image enhancement in accordance with the present invention. Many of the functional blocks 500 may execute as background processes on various components, either in distributed computing components, or on the user device, or elsewhere, and unaware to the user performing generalized tasks functionality in accordance with various aspects of the present invention.

As illustrated in FIG. 5A, the functionality 500 may start in block 502 with one or more users (e.g., users 1, user 2, user k) engaging in a dialog with a dialog system, which may be provided by server 508.

An activation trigger component 504 may identify, via agent component 506, one or more questions in a dialog between one or more users (e.g., users 1, user 2, user k) using server 508. For each question identified, the activation trigger component 504 may monitor subsequent dialogs to identify potential answers to the question, as well as statements suggesting that users (e.g., users 1, user 2, user k) do not know the answer.

For identifying whether there are potential answers or uncertain statements, a statement classifier may be used by the activation trigger component 504. For example, if no answers (e.g., 0 answers) are given, an alert/flag may be provided/generated to activate the answer lookup component 522 of FIG. 5B. For an answer lookup, a knowledge base may be accessed and used. If at least one answer (e.g., 1 answer) is given, then an alert/flag may be initiated, generated, and/or provided to activate the answer checkup component 524 of FIG. 5B. The answer checkup component 524 may use the answer lookup component 522 to check/determine/assess a correctness of a candidate answer. For checking whether the answer provided by the answer checkup component 524 and the user(s) (e.g., users 1, user 2, and/or user k) during the conversation matches, a sentence similarity checker may be used. If two or more answers (e.g., 2 or more answers) are provided, then an alert/flag may be initiated, generated, and/or provided to activate the conflict detector component 526, which in turn will use answer checkup component 524 for checking the correctness of the candidate responses.

Returning back to FIG. 5A, consider the following scenario where answer "A" may be a candidate answer generated by either the answer lookup component 522, the answer checkup component 524, and/or the conflict detector component 526. A machine learning operation (e.g., using IBM® Watson® conversation service "WCS") may be used to construct a candidate response "R." The template may include keywords that are extracted automatically from the candidate answer A. The candidate response "R" may be presented to the user(s) via agent component 510 via the server 508.

It should be noted that the answer lookup component 522, the answer checkup component 524, and/or the conflict detector component 526 of FIG. 5B may be triggered based on a question/conflict being detected. For example, a question (e.g., What is the capital city of country "X" ?) may be issued/raised during the conversation between one or more users (e.g., users 1, user 2, and/or user k) and none of the users (e.g., users 1, user 2, and/or user k) provide an answer.

The answer lookup component 522, which is a question answering component, may be activated and used to provide an answer (or previous conversation history). For a question raised with exactly one answer provided, the answer checkup component 524, which checks whether the answer provided is correct, may be activated and but may not intervene with the dialog and/or may be activated and provide a correct answer. For a question raised and more than one answer are provided and/or users (e.g., users 1, user 2, and/or user k) are in a conflict for a specific statement, conflict detector component 526 may be activated and resolve the conflict for the specific statement and provides an answer to one or more users (e.g., users 1, user 2, and/or user k).

Figure 6:
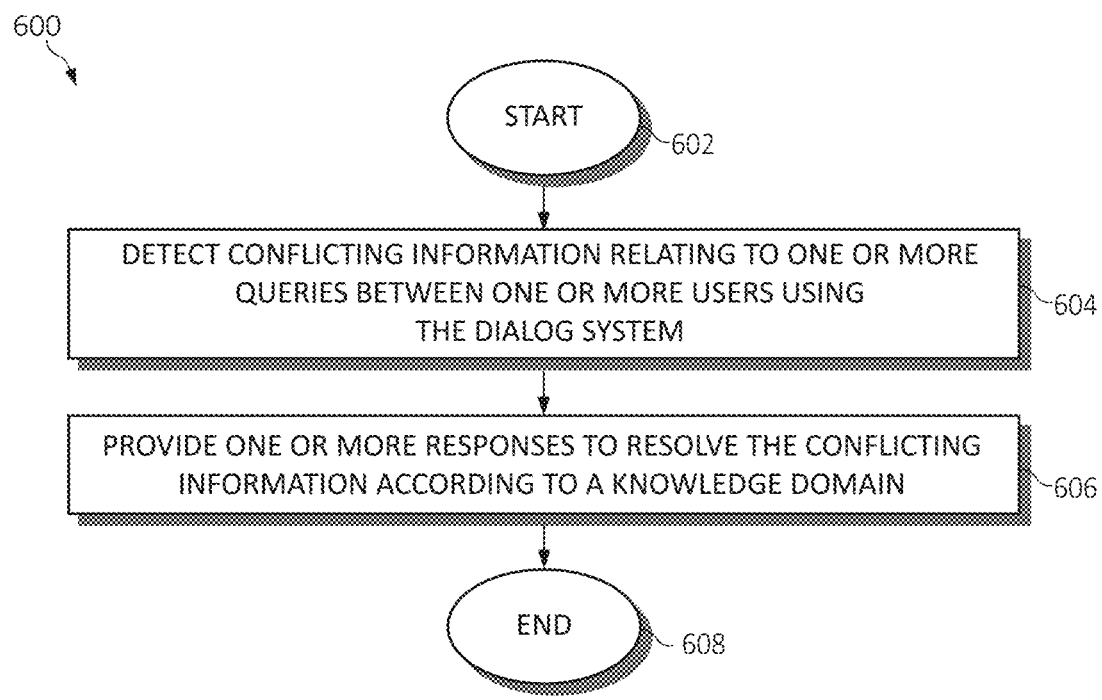
FIG. 6 is a flowchart diagram depicting an additional exemplary method for intelligent resolution of conflicting information in a dialog system in a computing environment in accordance with an embodiment of the present invention.

Turning now to FIG. 6, an additional method 600 is illustrated for intelligent resolution of conflicting information in a dialog system in a computing environment, in which various aspects of the illustrated embodiments may be implemented. The functionality 600 may be implemented as a method executed as instructions on a machine, where the instructions are included on at least one computer readable medium or on a non-transitory machine-readable storage medium.

The functionality 600 may start in block 602. Conflicting information relating to one or more queries may be detected between one or more users using the dialog system, as in block 604. One or more responses may be provided to resolve the conflicting information according to a knowledge domain, as in block 606. The functionality 600 may end in block 608.

In one aspect, in conjunction with and/or as part of at least one block of FIG. 6, the operations of 600 may include each of the following. The operations of 600 may monitor a dialog occurring between the one or more users using the dialog system. The operations of 600 may determine the one or more users provided one or more answers to the one or more queries, assess a level of correctness of the one or more answers to the one or more queries, and/or determine the one or more answers failed to resolve the conflicting information. The operations of 600 may search the knowledge domain to identify the one or more responses to resolve the conflicting information. Also, one or more users may be queried to collect additional information to assist with resolving the conflicting information upon detecting conflicting information.

The operations of 600 may initiate a machine learning to perform one or more machine learning operations to collect the user feedback, perform the semantic analysis, train a classifier to classify the one or more queries, learn contextual data associated with the one or more queries, and collect and use a plurality of historical conversations of the dialog system to assist with providing the one or more responses to resolve the conflicting information of the dialog system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, for providing intelligent resolution of conflicting information in a dialog system in a computing environment, the method comprising:
    monitoring, by an automated monitoring agent programmatically intercepting conversation data within a cognitive computing system comprising the dialog system, a voice dialog occurring non-electronically between a plurality of users in physical proximity to the dialog system, wherein the plurality of users direct the voice dialog only to one another as the automated monitoring agent transparently observes the voice dialog and the monitoring is performed as a background operation by the automated monitoring agent recursively analyzing the voice dialog;
    detecting, by the automated monitoring agent, a first utterance by a first user of the plurality of users relating to a particular query of one or more queries being discussed only between the plurality of users as part of the voice dialog, wherein the particular query has only one empirically correct answer;
    detecting, by the automated monitoring agent, a second utterance, having conflicting information with the first utterance, by a second user of the plurality of users relating to the particular query, wherein at least one of the first utterance and the second utterance are incorrect with respect to the only one empirically correct answer; and providing, by the dialog system, one or more responses to the plurality of users to resolve the conflicting information by providing the only one empirically correct answer according to a knowledge domain, wherein the providing of the one or more responses is performed only to intervene in the voice dialog between the plurality of users and any output of the dialog system with respect to the monitoring is performed to resolve the conflicting information detected between the first and second utterances, and wherein the one or more responses provided by the dialog system include one or more reasons and evidences that are used to resolve the conflicting information, wherein the knowledge domain is populated by the one or more reasons and evidences that are extracted from historical conversations of the dialog system, and wherein the one or more responses are generated by retrieving the one or more responses from the knowledge base; assessing a correctness of the one or more responses to determine that the one or more responses are correct; and verifying non-existence of conflict in the one or more responses.

2. The method of claim 1, further including:
determining the plurality of users provided one or more answers to the one or more queries; and
assessing a level of correctness of the one or more answers to the one or more queries.

3. The method of claim 2, further including determining the one or more answers failed to resolve the conflicting information.

4. The method of claim 1, further including querying one or more of the plurality of users to collect additional information to assist with resolving the conflicting information upon detecting conflicting information.

5. The method of claim 1, further including initiating a machine learning mechanism to perform one or more machine learning operations to collect user feedback, perform a semantic analysis, train a classifier to classify the one or more queries, learn contextual data associated with the one or more queries, and collect and use a plurality of historical conversations of the dialog system to assist with providing the one or more responses to resolve the conflicting information of the dialog system.

6. A system, for intelligent resolution of conflicting information in a dialog system in a computing environment, comprising:
one or more processors with executable instructions that when executed cause the system to:
monitor, by an automated monitoring agent programmatically intercepting conversation data within a cognitive computing system comprising the dialog system, a voice dialog occurring non-electronically between a plurality of users in physical proximity to the dialog system, wherein the plurality of users direct the voice dialog only to one another as the automated monitoring agent transparently observes the dialog and the monitoring is performed as a background operation by the automated monitoring agent recursively analyzing the voice dialog;
detect, by the automated monitoring agent, a first utterance by a first user of the plurality of users relating to a particular query of one or more queries being discussed only between the plurality of users as part of the voice dialog, wherein the particular query has only one empirically correct answer;
detect, by the automated monitoring agent, a second utterance, having conflicting information with the first utterance, by a second user of the plurality of users relating to the particular query, wherein at least one of the first utterance and the second utterance are incorrect with respect to the only one empirically correct answer; and
provide, by the dialog system, one or more responses to the plurality of users to resolve the conflicting information by providing the only one empirically correct answer according to a knowledge domain, wherein the providing of the one or more responses is performed only to intervene in the voice dialog between the plurality of users and any output of the dialog system with respect to the monitoring is performed to resolve the conflicting information detected between the first and second utterances, and wherein the one or more responses provided by the dialog system include one or more reasons and evidences that are used to resolve the conflicting information,
wherein the knowledge domain is populated by the one or more reasons and evidences that are extracted from historical conversations of the dialog system, and wherein the one or more responses are generated by retrieving the one or more responses from the knowledge base; assessing a correctness of the one or more responses to determine that the one or more responses are correct; and verifying non-existence of conflict in the one or more responses.

7. The system of claim 6, wherein the executable instructions further:
determine the plurality of users provided one or more answers to the one or more queries; and
assess a level of correctness of the one or more answers to the one or more queries.

8. The system of claim 7, wherein the executable instructions further determine the one or more answers failed to resolve the conflicting information.

9. The system of claim 6, wherein the executable instructions further query one or more of the plurality of users to collect additional information to assist with resolving the conflicting information upon detecting conflicting information.

10. The system of claim 6, wherein the executable instructions further initiate a machine learning mechanism to perform one or more machine learning operations to collect user feedback, perform a semantic analysis, train a classifier to classify the one or more queries, learn contextual data associated with the one or more queries, and collect and use a plurality of historical conversations of the dialog system to assist with providing the one or more responses to resolve the conflicting information of the dialog system.

11. A computer program product for, by one or more processors, intelligent resolution of conflicting information in a dialog system in a computing environment, the computer program product comprising a non-transitory computer-readable storage medium having computer-readable program code portions stored therein, the computer-readable program code portions comprising:
an executable portion that monitors, by an automated monitoring agent programmatically intercepting conversation data within a cognitive computing system comprising the dialog system, a voice dialog occurring non-electronically between a plurality of users in physical proximity to the dialog system, wherein the plurality of users direct the voice dialog only to one another as the automated monitoring agent transparently observes the voice dialog and the monitoring is performed as a background operation by the automated monitoring agent recursively analyzing the voice dialog;

an executable portion that detects, by the automated monitoring agent, a first utterance by a first user of the plurality of users relating to a particular query of one or more queries being discussed only between the plurality of users as part of the voice dialog, wherein the particular query has only one empirically correct answer;

an executable portion that detects, by the automated monitoring agent, a second utterance, having conflicting information with the first utterance, by a second user of the plurality of users relating to the particular query, wherein at least one of the first utterance and the second utterance are incorrect with respect to the only one empirically correct answer; and an executable portion that provides, by the dialog system, one or more responses to the plurality of users to resolve the conflicting information by providing the only one empirically correct answer according to a knowledge domain, wherein the providing of the one or more responses is performed only to intervene in the voice dialog between the plurality of users and any output of the dialog system with respect to the monitoring is performed to resolve the conflicting information detected between the first and second utterances, and wherein the one or more responses provided by the dialog system include one or more reasons and evidences that are used to resolve the conflicting information, wherein the knowledge domain is populated by the one or more reasons and evidences that are extracted from historical conversations of the dialog system, and wherein the one or more responses are generated by retrieving the one or more responses from the knowledge base; assessing a correctness of the one or more responses to determine that the one or more responses are correct; and verifying non-existence of conflict in the one or more responses.

12. The computer program product of claim 11, further including an executable portion that:
   determines the plurality of users provided one or more answers to the one or more queries;
   assesses a level of correctness of the one or more answers to the one or more queries; and
   determines the one or more answers failed to resolve the conflicting information.

13. The computer program product of claim 11, further including an executable portion that queries one or more of the plurality of users to collect additional information to assist with resolving the conflicting information upon detecting conflicting information.

14. The computer program product of claim 11, further including an executable portion that initiate a machine learning mechanism to perform one or more machine learning operations to collect user feedback, perform a semantic analysis, train a classifier to classify the one or more queries, learn contextual data associated with the one or more queries, and collect and use a plurality of historical conversations of the dialog system to assist with providing the one or more responses to resolve the conflicting information of the dialog system.

\* \* \* \* \*